US008331767B2

(12) United States Patent
Singh et al.

(10) Patent No.: US 8,331,767 B2
(45) Date of Patent: Dec. 11, 2012

(54) MEDIA COMPOSITION SYSTEM WITH REMOTE CONNECTION

(75) Inventors: Harbaldeep Singh, Andover, MA (US); Scott E. Kohnle, Richardson, TX (US); Ronald C. Wallace, Lexington, MA (US)

(73) Assignee: Avid Technology, Inc., Burlington, MA (US)

( * ) Notice: Subject to any disclaimer, the term of this patent is extended or adjusted under 35 U.S.C. 154(b) by 212 days.

(21) Appl. No.: 12/859,942

(22) Filed: Aug. 20, 2010

(65) Prior Publication Data

US 2012/0045189 A1 Feb. 23, 2012

(51) Int. Cl.
*H04N 5/93* (2006.01)
*H04N 9/80* (2006.01)
(52) U.S. Cl. ....................................... 386/278; 386/239
(58) Field of Classification Search .................. 386/285, 386/278, 282, 200, 239, 240
See application file for complete search history.

(56) References Cited

U.S. PATENT DOCUMENTS

2005/0134739 A1* 6/2005 Bian .............................. 348/600

OTHER PUBLICATIONS

Adobe, "Using Adobe Stock Photos", White Paper, Apr. 2005, pp. 1-8.
Boris FX Press Release, "Boris FX and MyMusicSource Release Free Music Licensing Plug-in", Jan. 19, 2010, pp. 2-3.

* cited by examiner

*Primary Examiner* — Robert Chevalier
(74) *Attorney, Agent, or Firm* — Oliver Strimpel (57) ABSTRACT

Computer-based methods for time-based media composition of programs that include secondary material. The methods involve searching for secondary media available from secondary material providers over a wide-area network, selecting secondary material, receiving metadata pertaining to the selected secondary material, inserting a representation of the selected secondary media into a media composition, playing back a sequence of the media composition that includes the secondary media, wherein playback of the secondary media involves playing an evaluation version of the secondary media streamed to a media composition system over the wide area network, and displaying metadata pertaining to the selected secondary material. The media composition system facilitates purchasing and transfer, and re-linking of the secondary media for inclusion within the media composition. In-context previewing of secondary media facilitates selection of the optimal secondary material, accelerated workflows, and improved media cost control.

16 Claims, 4 Drawing Sheets

MEDIA COMPOSITION SYSTEM WITH REMOTE CONNECTION

BACKGROUND

When creating a media composition, producers and editors often wish to combine original media captured specifically for the new composition with pre-existing material. Examples of such pre-existing material are stock video footage and stock music. Typically, the pre-existing material, or "secondary material," is identified and acquired during the post-production phase of media composition. Current workflows for incorporating such material involve searching catalogs of material offered by providers of secondary material, identifying the desired material, acquiring rights to use the material, including paying for the material if required, and receiving a copy of the acquired material, commonly by downloading the material over the Internet. Once the material is received, it can be imported into a post production editing system. Such a workflow is cumbersome, involving numerous steps. Furthermore, the process is often wasteful, since a proper evaluation of the effectiveness of the acquired secondary material is only possible once the material has been paid for, downloaded, imported into the editing system, and cut into a sequence. In addition, time-based media clips offered by the secondary material providers have a predetermined duration; an editor may only be interested in using a fragment of a clip, but is required to acquire the entire clip in order to obtain the fragment, with the consequent increase in cost, and download delay.

SUMMARY

Media composition methods and systems feature researching and selecting secondary footage, previewing it in the context of a media composition, purchasing and downloading it, all from within a media composition system or a media editing system. The in-editor workflow enables rapid in-context preview and editing of secondary materials via streamed proxies that are inserted into media that is already present in the media composition.

In general in one aspect, a method of creating a time-based media composition, the method including using a computer-based media composition system connected to a wide-area network to search for secondary material available from secondary material providers connected to the wide-area network. The method further involves: selecting an item of secondary material located during the searching step; receiving over the wide area network descriptive metadata pertaining to the selected secondary material item; inserting at a temporal location within the time-based media composition a representation of the selected secondary material item, wherein the time-based media composition includes primary media; and outputting a rendered portion of the time-based media composition spanning the temporal location, the portion including a portion of the primary media and a portion of the secondary material item, wherein outputting the secondary material portion involves outputting an evaluation version of the secondary material item that is streamed to the media composition system over the wide area network.

Some embodiments include one or more of the following features. The selected secondary material item is a video clip or an audio clip. Displaying the outputted rendered portion of the time-based media composition on a display device connected to the media composition system. The selected secondary material item includes at least one of a digitally represented font, a sound effect, a graphical element, a video effect and an audio effect. Using the media composition system to purchase at least a portion of the selected secondary material item for inclusion within the time-based media composition. The received descriptive metadata includes a cost associated with usage of the purchased portion of the secondary material item within the time-based media composition, and the media composition system displays an indication of the cost. Transferring to the media composition system over the wide-area network an original quality version of the purchased portion of the secondary material item. Dynamically re-linking the original quality version of the transferred portion of the selected secondary material item to the media composition. The received descriptive metadata includes information pertaining to usage rights available for the secondary material item. The inserted location is expressed as a time offset within the time-based media composition.

Under another aspect, a system for editing a time-based media composition includes a memory for storing computer-readable instructions and a processor connected to the memory, wherein the processor, when executing the computer-readable instructions, causes the media composition system to: enable a user to search for secondary material over a wide-area network connected to the media composition system; enable the user to select an item of secondary material identified by the searching; receive over the wide area network descriptive metadata pertaining to the selected secondary material item; enable the user to insert at a temporal location within the time-based media composition a representation of the selected secondary material item, wherein the media composition includes primary media; and output a rendered portion of the time-based media composition spanning the temporal location, the portion including a portion of the primary media and a portion of the secondary material item, wherein outputting the secondary material portion involves outputting an evaluation version of the secondary material item that is streamed to the media composition system over the wide area network.

Under yet another aspect, a computer program product includes a computer-readable memory and computer-readable instructions stored in the computer-readable memory that, when executed by a computer connected to a wide-area network, instruct the computer to perform a method of creating a time-based media composition that includes secondary material, the method including some or all of the features listed above.

Under yet another aspect, a computer-based method for time-based media composition includes: receiving at the computer over a wide area network a stream of data representing a clip of time-based media and descriptive metadata pertaining to the clip, wherein the clip is encoded in a clip media format and wherein the descriptive metadata is encoded in a clip metadata format; using a media plug-in module to repackage the clip into a player format for playback by a media player implemented on the computer, wherein the player format is not dependent on the clip media format; using a metadata plug-in module to reformat the descriptive metadata into a player metadata format compatible with the media player, wherein the player metadata format is not dependent on the clip metadata format; and using the media player to output the repackaged media clip and at least a portion of the descriptive metadata on a display connected to the media player.

Various embodiments include one or more of the following features. The clip of time-based media includes a video clip. The clip of time-based media includes an audio clip. Receiving at the computer over a wide-area network, a stream of data representing a second clip of time-based media and descriptive metadata pertaining to the second clip, wherein the second clip is encoded in a second clip media format, using a second media plug-in module to repackage the second clip into the player format, and using the media player to output the reformatted second media clip on a display connected to the media player. Receiving at the computer over a wide-area network, data representing a second clip of time-based media and descriptive metadata pertaining to the second clip, wherein the descriptive metadata pertaining to the second clip is encoded in a second clip metadata format, using a second metadata plug-in module to reformat the descriptive metadata pertaining to the second clip into the player metadata format, and using the media player to output the reformatted descriptive metadata pertaining to the second clip.

Under a still further aspect, a method of creating a time-based media composition includes: using a computer-based media composition system connected to a wide-area network to search for media available from secondary material providers connected to the wide-area network; selecting an item of media located during the searching step; receiving over the wide area network descriptive metadata pertaining to the selected media item; inserting at a temporal location within the time-based media composition a representation of the selected media item; outputting a rendered portion of the time-based media composition spanning the temporal location, the portion including a portion of the selected media item, wherein outputting the portion of the selected media item involves outputting an evaluation version of the selected media item that is streamed to the media composition system over the wide area network; and using the media composition system to purchase at least a portion of the selected media item for inclusion within the media composition.

Some embodiments feature the following features. The selected media items include a video clip and an audio clip, and a representation of the selected audio clip is inserted at a second temporal location within the time-based media composition, wherein a time span of the inserted representation of the selected audio clip overlaps with a time span of the inserted video clip, and outputting the rendered portion of the time-based involves playing an evaluation version of the selected audio clip that is streamed to the media composition system over the wide area network.

DETAILED DESCRIPTION

The creation of media, especially film, video, and music, often occurs in an environment that is constrained by tight financial budgets and time deadlines. In such an environment, the individuals and teams involved in media creation place a great premium on time efficiency in their workflows, while at the same time keeping project costs under control. Thus, workflow improvements that reduce the number of steps required during media project creation, reduce lags caused by transfer of media over networks, facilitate rapid and effective communication among team members, or avoid the need to perform revisions resulting from cost overruns are highly advantageous. An aspect of media creation that commonly introduces inefficiencies, delays, and cost issues is the incorporation of secondary material into the media composition. The media composition and editing methods, systems, and computer program products described herein address this aspect by providing workflows and features for evaluating and incorporating secondary material into a media composition.

As used herein, secondary material refers to pre-existing content that is not created specifically for the media composition being created. Such material generally originates from a source other than the media composition's production team. Secondary material includes, but is not limited to video clips, audio clips, still imagery, video effects, audio effects, graphics, and fonts. In the described embodiment, secondary material is stored on a remote secondary material provider system connected to a wide area network, such as the Internet. Secondary material is distinguished from primary material, which refers to content that is generated by the entity creating the media composition, such as an individual producer or music composer, an editorial team, or an organization, such as a film studio or a television broadcast company. Primary material is created specifically for the media composition, and may be stored locally to the media composition system being used to create the composition, or on a server connected to the composition system by a high bandwidth network.

Figure 1:
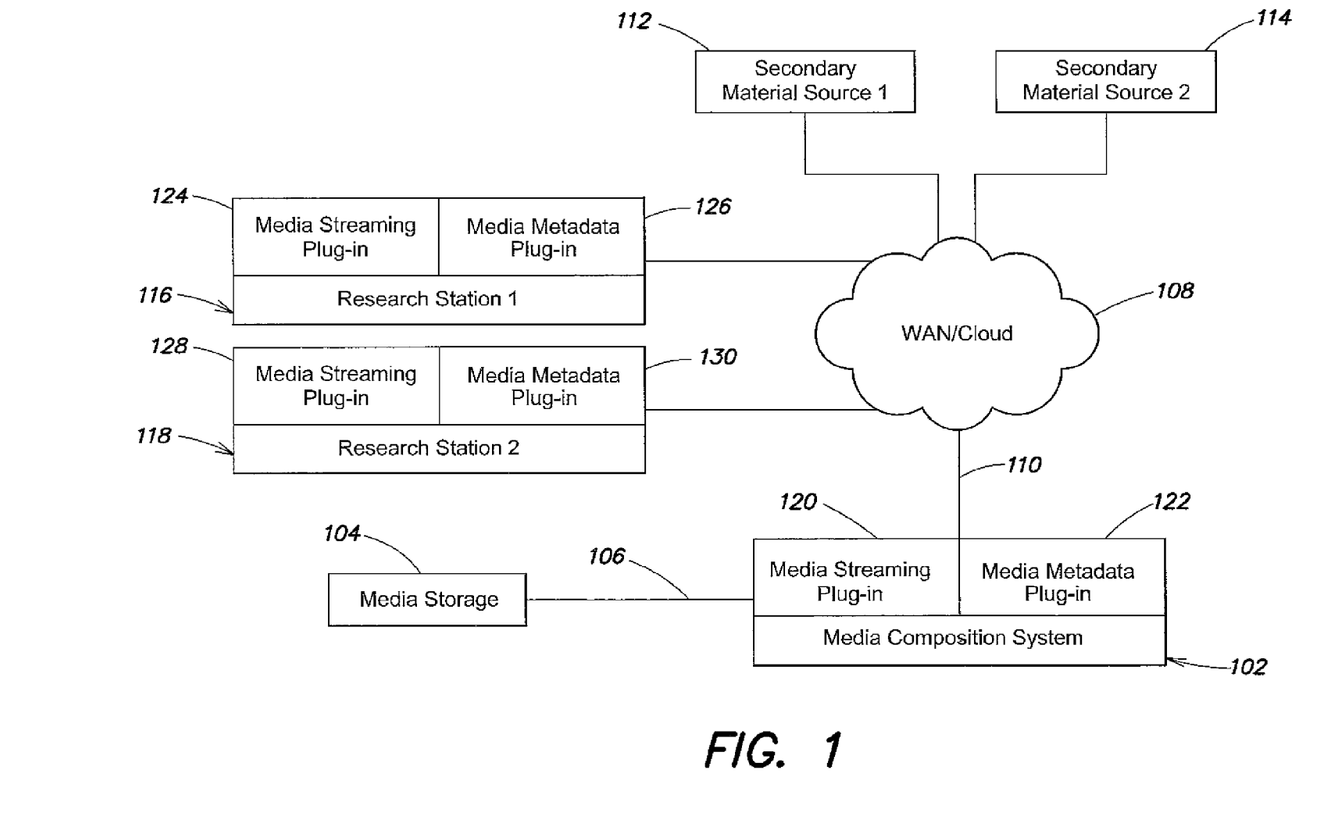
FIG. 1 is a high level block diagram of a media composition system and remote systems involved in incorporating secondary material into a media composition.

Referring to FIG. 1, a system for incorporating secondary material within a media composition includes media composition system 102, which may be a non-linear media editing application that runs on a client, such as a computer running Microsoft Windows® or the Mac OS®. Examples of non-linear media editing applications include Media Composer from Avid Technology, Inc. of Burlington, Mass., described in U.S. Pat. Nos. 5,267,351 and 5,355,450, which are incorporated by reference herein, and Final Cut Pro® from Apple Computer, Inc. of Cupertino Calif. Media composition system 102, and optionally one or more additional media composition systems (not shown), are connected to media storage 104 by high bandwidth network 106, implemented using such protocols as Fibre Channel, InfiniBand, or 10 Gb Ethernet, and supporting bandwidths on the order of gigabits per second or higher. Media storage 104 may include a single device or a plurality of devices connected in parallel. The primary material being used for the media composition is stored on media storage 104, or on storage included within the client system supporting the non-linear editing application. After acquisition and downloading, secondary material may also be stored on media storage 104.

Media composition system 102 is connected to wide area network 108, such as the Internet, or the "Cloud" via a low-bandwidth connection 110, such as an Ethernet network, a wireless network or an Internet connection, having a bandwidth of the order of 1-100 megabits per second or higher.

One or more sources of secondary material 112, 114 are connected to the wide area network, and are accessed by the media composition system via the low band-width connection and the wide area network. In addition, one or more research stations 116, 118 may also be connected to the wide area network. Research stations may be implemented on a thin client computer.

Secondary material providers offer evaluation materials that enable prospective customers to assess the secondary material. Examples of evaluation materials include but are not limited to: for video, a low resolution proxy or a watermarked version; for audio, a low sample rate clip; for still imagery, a low resolution and/or watermarked image; for a video effect, a version of the effect software with a watermark or other feature that indicates an evaluation version is being used; and for fonts, a subset of the font characters. In order to facilitate the assessment or preview of evaluation materials within the context of a media composition being edited using media composition system 102, two types of plug-in software modules are provided: Media Streaming Plug-in (MSP) 120 and Media Metadata Plug-in (MMP) 122. Together, the MSP and MMP receive and repackage both structural and descriptive metadata associated with the evaluation materials into a format handled by the media composition system, such as Advanced Authoring Format (AAF).

MSP 120 handles the structural metadata associated with the evaluation materials, enabling streaming media to be browsed and edited within the composition system without any transcoding, rewrapping, importing, and/or copying of media. In the described embodiment, MSP 120 is compatible with the plug-in architecture developed by Avid Technology, Inc. for file-based media workflows, and known as Avid® Media Access (AMA). The system may include multiple MSPs, each one handling a different media streaming format deployed by the secondary material providers. Streaming media formats include but are not limited to QuickTime® and Adobe® Flash®. The evaluation material resides on remote secondary material sources 112, 114, and may be requested via a HTTP protocol and streamed in real-time to media composition system 102. Upon receiving the streamed material, MSP 120 extracts frames from the streamed packet, decodes it, and sends it to the media composition system, which in turn may output the media.

Figure 2:
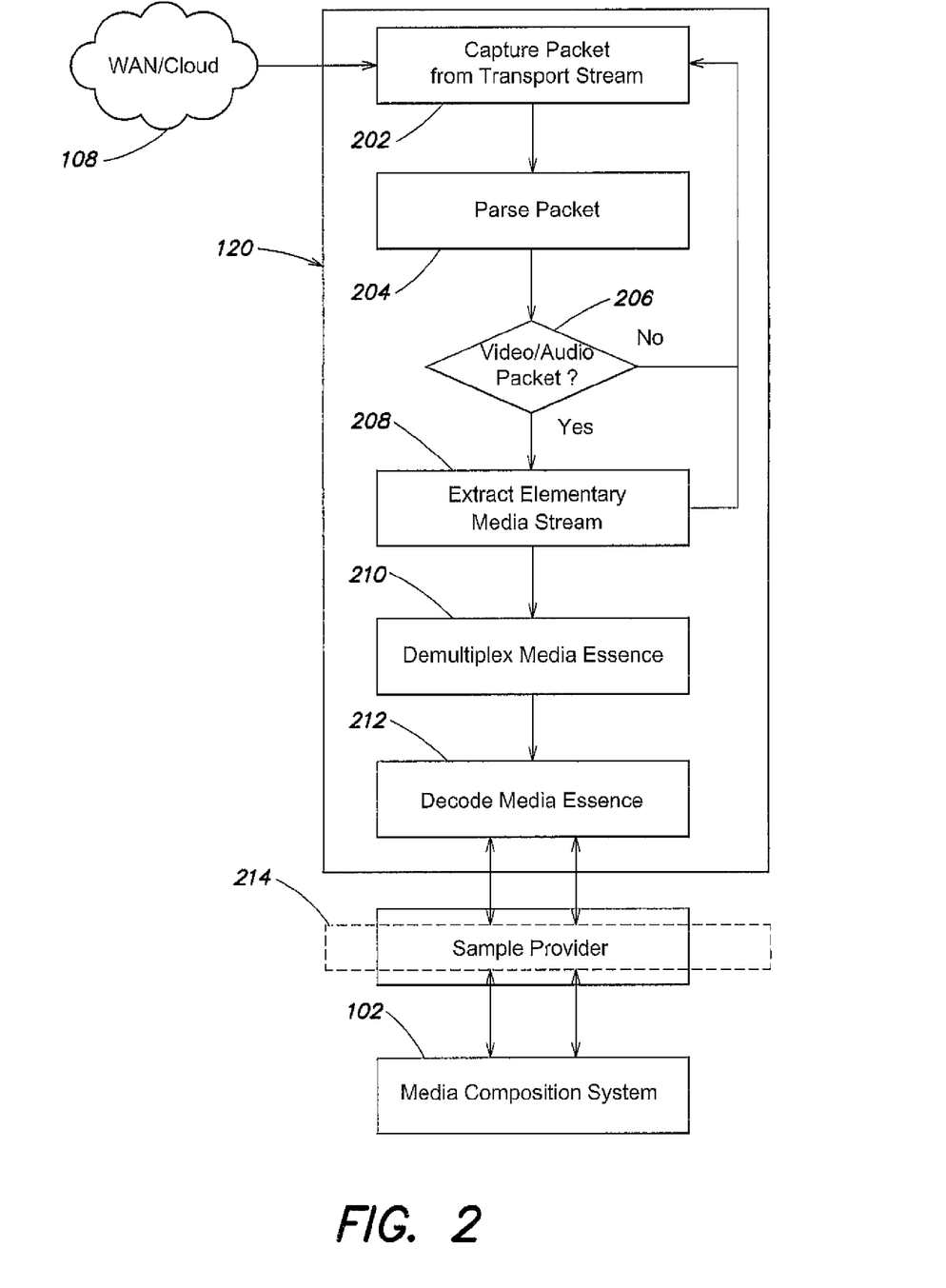
FIG. 2 is a flow diagram of a software plug-in for receiving streaming media.

The high-level actions performed by MSP 120 are illustrated in the flow diagram shown in FIG. 2. As packets are received from WAN/Cloud 108, each packet from the transport stream is captured (202) and parsed (204). A check is performed to determine if the packet is a video or audio packet (206), and if not, the packet is ignored and the MSP captures the next packet from the transport stream. The packet format may be RTP or any of the standardized packet formats for delivering video and audio over the Internet. If the packet is a video or audio packet, the elementary media stream is extracted (208), and passed on to the demultiplexer for separating video and audio essence (210), while the next packet is captured (202). The media essence is then decoded (212) by a decoder module and the decoded media is output to sample provider 214, which provides the supported video and audio formats to the media composition system. Sample provider 214 also provides a mechanism for the media composition system to request video and/or audio samples in real-time during playback. In response to a request via the sample provider, the MSP provides the desired video frame and/or audio sample, which have been decompressed in decoding step 212. The sample provider in turn provides the samples to media composition system 102.

The second type of plug-in module, referred to as Media Metadata Plug-in (MMP) 122 handles the descriptive metadata associated with the evaluation materials, which may include data that originated with the media itself, or data provided by the secondary material provider. Descriptive metadata includes non-real-time metadata that includes descriptive information pertaining to the secondary material item as a whole, such as: title; date of production; content summary; names of individuals such as a producer, director, composer, actor; price; and scope of available usage rights. Descriptive metadata may also include real-time metadata that applies to specific sections, frames, or segments of the secondary material, such as GPS coordinate, scene description, closed captions. Each secondary media provider may provide descriptive metadata in one of several standard formats, or in a unique proprietary format. The plug-in architecture enables multiple MMPs to be provided, each one handling the extraction and reformatting of a corresponding provider's metadata to a form that is recognized by the media composition system. This architecture permits the media player within the media composition system to be abstracted from the source format of the media and its descriptive metadata, with the ability to handle new remote streaming media and provider metadata formats simply via the provision of corresponding new MSP and MMP plug-ins.

Research stations 116, 118 enable media researchers to conduct searches for secondary media remotely and independently of an editor and the media composition system. Each research station runs a search tool application provided with versions of the two types of plug-in described above in connection with media composition system 102. These plug-ins (124, 126, 128, 130) are adapted to provide metadata in a form recognized by the search tool application, enabling the researcher to have full access to all the media and provider metadata.

Figure 3:
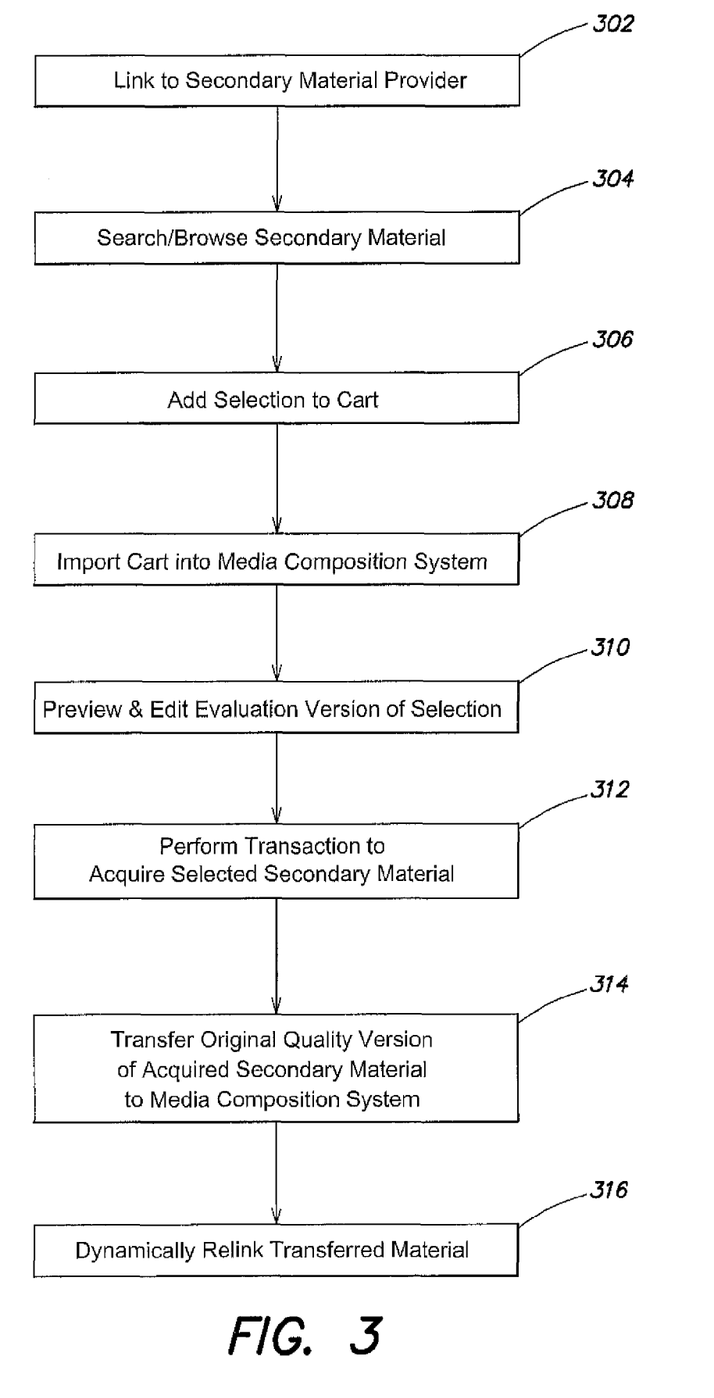
FIG. 3 is a flow diagram for incorporating secondary material in a media composition according to the described embodiment.

We now describe an exemplary workflow for incorporating secondary material within a media composition with reference to FIG. 3. In step 302, a researcher or an editor, using research station 116, links to one or more sources of secondary material over a wide area network. In the described embodiment, the research station features a search tool, such as a browser-based application, running on an interne-connected client. In some embodiments, the researcher is not registered with secondary material providers; in other embodiments, the researcher has a pre-established account with one or more secondary material providers, so that after performing a user authentication step (not shown), the secondary material providers may apply pre-established search preferences corresponding to a user profile, such as limiting the search to a certain format, price range, or territorial licensing regime. The research station may also provide payment details to secondary providers so that paid transactions can occur, for example, when paying to receive a proxy.

After linking to one or more secondary material providers, the researcher searches for secondary material (step 304). The researcher may limit the search to a single provider, or perform a federated search across multiple secondary material providers to obtain aggregated search results. For each of the secondary providers selected for searching, the researcher may use search terms directed to any of the secondary material metadata exposed by the providers. Examples of such metadata include, but are not limited to: descriptive metadata, such as a content summary (e.g., content description, search terms, geographic location, perspective such as aerial, names of personalities in the clip, event description, film style such as time lapse or effects used, and capture date), language, and names of individuals or companies responsible for the content such as the director, producer, composer, musical performer, and actor; structural metadata, such as file format, compression scheme, frame rate, audio sample rate, audio compression; and time-synchronous metadata, such as camera data, GPS coordinates, subtitles, and closed captions.

The researcher then assesses the search results by reviewing the evaluation material offered by the secondary material provider, for example by listening to a low sample-rate audio clip, or viewing a proxy video clip. The researcher selects items of interest that may be suitable for inclusion within the media composition, and places the selected items in a virtual cart (step 306). The cart may be displayed on the research station as a window that includes an indication of the selected items. The indications may include text, thumbnails, and metadata that identifies and provides information about the selected media. The cart includes a copy of some or all of the metadata associated with the selected media, optionally a pointer to the metadata, a link to the source of the secondary material, and may also include a copy of the evaluation material itself.

The secondary media researcher may annotate search results, adding comments, markers or locators on clips with precision down to an individual frame. Annotations remain associated with the search results and are passed along to the editor at the media composition system when the cart is transferred. The editor may add further annotations, and send these back to the researcher, who may then use the editor's comments to alter or refine the search. A search result cart may be passed back and forth between multiple members of a production team, with annotations and approval added at any of the steps along the way. The cart is a small object, and is readily shared over low bandwidth networks, such 3G wireless networks that link mobile devices, including smart phones and tablet computers.

Metadata provided by secondary media providers may change over time. For example, a provider may change pricing, or certain territories available for licensing may be added or dropped. As long as a media item is retained in the virtual cart, or is otherwise selected by the researcher, the secondary material provider may push updated metadata to the research station. Such updating ensures that media project personnel are always working with up-to-date information.

The research station may include advanced search options to assist the researcher in satisfying various requirements or constraints of the project. For example, when the researcher has a budget limit for secondary material, returned search results can be limited to a selected cost range (including zero cost for free material), either for each individual item, or in aggregate. Another search feature enables the researcher to select secondary material that satisfies all the search requirements except cost, and then request that the system look for lower cost alternatives and/or limit the search to providers offering advantageous pricing. Alternatively, the system may automatically select search results not to exceed a pre-determined project budget.

Figure 4:
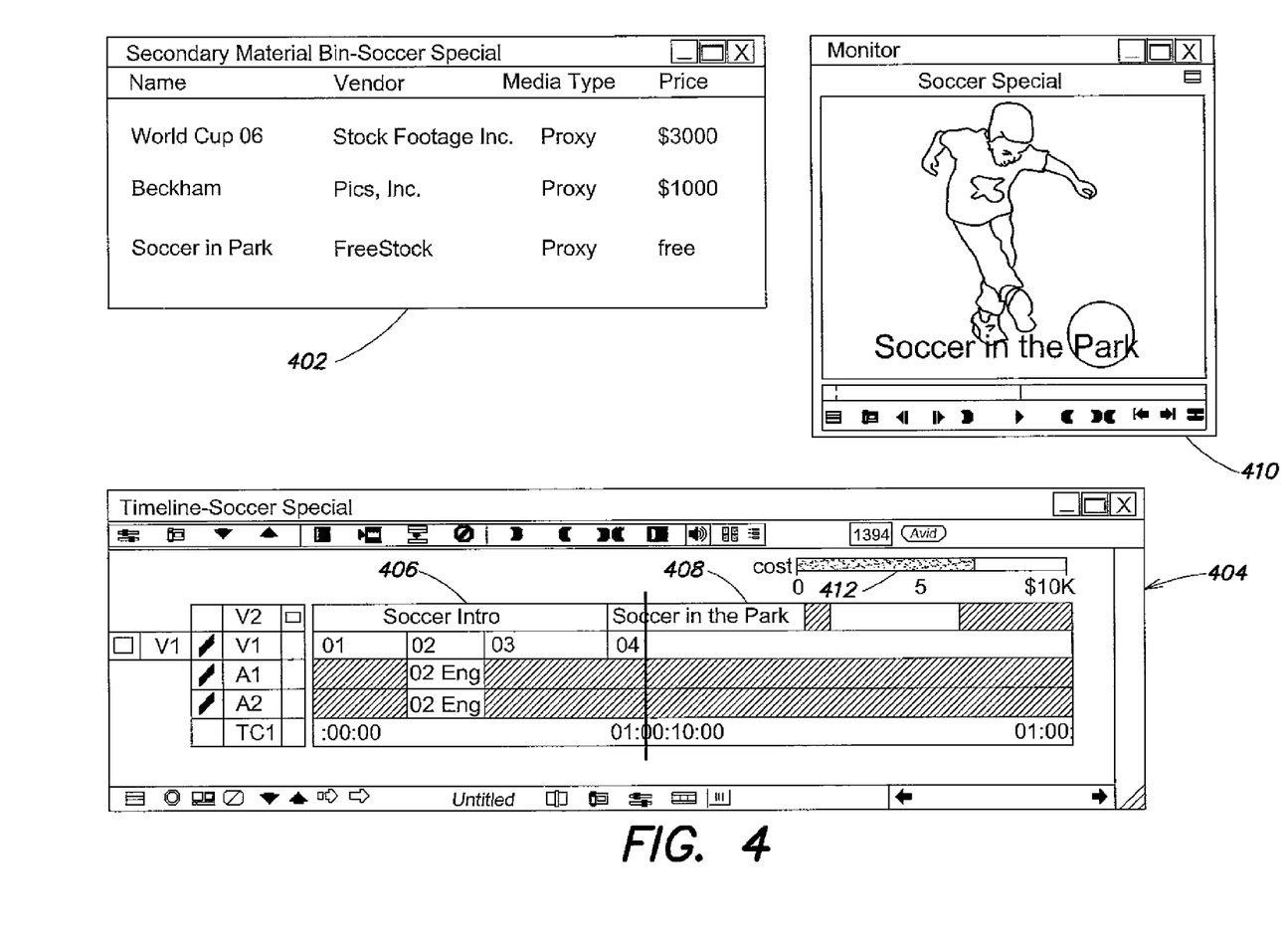
FIG. 4 is a screenshot of a media composition system illustrating an interface for composing media with secondary material.

Upon a command from the researcher, or at the request of an editor using the media composition system, the contents of the virtual cart are transferred over the wide area network, and imported into the media composition system (step 308). Referring to FIG. 4, which illustrates a screen shot of media composition system 102, indications of the imported search results are displayed in secondary material bin 402. Any metadata that is available from the secondary provider is available to the media composition system, and may be displayed in bin 402 to identify and describe the media. Furthermore, the metadata is available for generating various reports, as described below.

In some embodiments, the virtual cart may be uploaded to an authenticated server in the Cloud, and accessed upon demand by an editor. The editor may review the search results on a mobile device, such as a laptop, tablet computer, or smartphone, and upload annotations and comments for subsequent retrieval by the researcher. Alternatively, the editor accesses the server using the media composition system, and imports the cart directly into a bin within the system.

The editor may browse and edit the imported evaluation versions of the secondary material directly within the media composition (step 310), such as by dragging an indication of a clip from bin 402 into media composition timeline 404. When working with video or audio secondary material, the secondary media is cut into a sequence, and evaluated in the context of adjacent clips in the composition's timeline. Referring again to FIG. 4, the timeline includes both primary media 406 and secondary media 408, which at this stage represents the evaluation secondary media. Playing back a sequence of the media composition that spans both primary media and secondary evaluation media in monitor window 410 proceeds without any significant lag when the secondary evaluation material is played, since the media is streamed directly from the remote secondary material provider. Furthermore, transitions, and certain video or audio effects may be added to the secondary evaluation material. The editor may also embed time-code into the secondary media. For still image secondary material, the editor may add pan and zoom effects to achieve the desired result. Thus, by making the evaluation version of the secondary material a "first class citizen" within the editing system, an editor can assess the secondary material within its intended usage context, avoiding delays and monetary outlays associated with prior workflows involving media purchase and download. In addition, metadata pertaining to cost and usage rights may be accessed in real time by the media composition system, which uses the information to generate and display costs and distribution rights associated with the previewed selection.

Playing of a sequence of the composition involves a player module within media composition system 102, sometimes referred to a "media engine." As described above, the player module links to one or more media sources, and optionally to graphics, effects, material for compositing, and other information pertaining to the media composition, and renders it into a form suitable for preview. For a video composition, the rendering takes the form of a video track and an audio track. In the workflows described above, the player outputs the rendered composition to a display for previewing by the editor. In other workflows, the output is sent to a recording device for subsequent review, or sent over a network, either locally to another station, or over a wide area network for preview at another location. The player output may be directed to any device able to receive the rendered output.

As described above, the media composition system is able to play back a preview of a sequence of the media composition that spans both primary material and secondary evaluation material. For a video composition, to play back the primary material the system requests and displays frames from the primary material stored on primary media storage 104. In various embodiments, primary media is stored on shared storage, which may be in a remote location accessed over a wide area network. To play back a clip or clip portion of the secondary material evaluation material, the system displays frames from media that is being streamed over the low bandwidth network from the secondary provider. Frames may be prefetched and buffered in order to ensure a seamless playback transition between the primary media and the evaluation secondary material, the extent of the prefetching and buffering being determined in part by the bandwidth that is available over connection 110 between the media composition system and the wide area network. Prefetching and buffering may be multi-threaded to help eliminate latencies. For example, when playing a sequence including multiple remote secondary media clips, the system may spawn a thread for each of the secondary media clips, each thread using a separate instance of the required media and metadata plug-ins. Multiple threads may also be spawned to prefetch and extract frames from different parts of a single secondary media clip. The number of threads spawned is based on the bandwidth available for transferring the secondary media to the media composition system from the remote provider. This scheme helps optimize the network resources so that an editor can play a cut sequence containing an arbitrary combination of primary, locally stored media, and secondary, remote media from end to end without experiencing any significant buffering pauses.

Network traffic and any media prefetching delays may also be reduced by caching the received secondary evaluation material locally to the media composition system. In this scheme, the second and subsequent times an editor wishes to preview a particular secondary media element, the system retrieves the material from the cache rather than requesting it again from the provider over the Internet.

In order to help distribute network load, and also to facilitate the evaluation of more than one element of secondary material at a time, the system may permit a hybrid workflow, in which secondary evaluation materials are received at the media composition system both via streaming (as described above) and by the downloading of proxies. In this workflow, the editor may request that proxies for a selection of secondary material, such as, for example, all the items in a secondary material bin, be downloaded in the background, while editing and previewing of the media composition proceeds. When an item of secondary evaluation material is required for playback, the system retrieves a downloaded proxy from local storage if it is available, but otherwise, i.e., if the system has not yet been able to download it, the required material is streamed in real-time over the network into the media composition system. The MSP and MMP plug-ins reformat the retrieved media in a similar fashion, whether it is being remotely streamed, or read from local storage.

An editor may also work in a pure proxy mode, in which all secondary evaluation media is downloaded to local storage before it is previewed and evaluated within the media composition. In both the hybrid and pure proxy workflows, more than one element of secondary evaluation material is available to the media composition at a time. For example, the system may receive a first proxy by remote streaming, and a second from local storage. Having more than one proxy available at a time provides the editor with the ability to preview portions of the composition in which more than one item of secondary media is played together, such as in a dissolve transition from a first to a second secondary item, or when compositing multiple secondary clips.

An editor who wishes to preview a secondary audio clip as background to a secondary video clip may cause the system to receive evaluation versions of both the video and audio, insert them both into the media composition in their intended locations, such that they at least partially overlap, and preview them together. This provides an in-context means of evaluating the audio in its intended role.

Note that in all of the described workflows, secondary media metadata is available to the media composition system at once, prior to media streaming or download.

The methods of searching and previewing secondary material described above are applicable to the creation and editing of media compositions for which no primary media exists. For some such compositions, the final composition includes only secondary material. In others, the secondary material is identified, evaluated and cut into a sequence first, and primary material is added later. The system permits an editor to preview selected secondary material items in the context of other secondary material items within a composition before making a purchasing decision. As indicated above, several items of secondary material represented by the provider's evaluation materials may be previewed together, enabling the secondary media to be evaluated in sequence, optionally with transitions or compositing involving multiple secondary media clips, and with certain effects applied. Secondary material that has already been acquired, downloaded, and linked, as described for subsequent steps in the workflow below, may be effectively be treated as primary material, even though such material is not original to the media composition.

In sum, the described system provides a realistic "in-context" evaluation environment, greatly assisting editors to make optimal, time and cost-efficient choices of their secondary material for media compositions before purchase.

If the editor decides to incorporate into the media composition some of the secondary material corresponding to the evaluation materials received in step 310, the system facilitates transaction step 312. Information may be requested from the editor in order to determine the type of license required, and the corresponding cost, if any. The information may be stored in a user profile, which may include a list of preferred secondary media providers, logins for each provider, payment account details, and a profile of the media composition production. The production profile includes one or more of: the project type, e.g., advertising, corporate/government, documentary, education, entertainment; distribution, e.g., broadcast and cable TV, Internet, non-broadcast media; territory; and term. If payment is required, a standard e-commerce transaction is performed.

Licensing and pricing may also be determined in part by the editor's selection of only a portion of a media clip for inclusion within the composition. Thus if a secondary media provider offers reduced pricing for portions of a time-based media clip, such as pricing pro-rated by duration, the system automatically computes the cost based on the duration of the clip portion that the editor has cut into the media composition sequence. In addition, usage rights may also vary between the various portions of a media clip, and the system may also take this into account when preparing the appropriate license. Sub-clip licensing and pricing may offer significant savings for an editor, and also reduce media transfer times, since only the required portion of original media is transferred.

Once transaction step 312 is complete, the media composition system transfers the acquired original quality media from the secondary media provider to media storage 104 or other local storage over the wide area network and low bandwidth connection 110 (step 314). The transfer is preferably performed in the background, enabling the editor to continue working on the composition. After the transfer is completed, the media composition system dynamically relinks the transferred secondary material to the media composition (step 316).

Another embodiment involves a single station workflow, in which the steps described above in connection with the research stations prior to importing step 308 are performed by using the media composition system. In this workflow no research station is involved, and the research phase, as well as the editing and transaction phases are conducted with the media composition system. In various embodiments, research proceeds in parallel, with one or more media researchers conducting research at local or remote research stations, and an editor using the media composition system. In the single station workflow, secondary material provider linking step 302, searching and selection of secondary material step 304, and placement of an indication of selected secondary material in a cart or bin step 306 are performed within the media composition system, rather than using an external research station. In this implementation, an editor does not need to leave the media composition application while accomplishing all the steps (i.e., 302, 304, 306, 310, 312, 314, and 316) required to search, acquire, and incorporate secondary material into a finished media composition. (Step 308 is not applicable in this workflow.)

In a variant of the single station workflow, the editor may select a subset of the items in the cart for inclusion within a bin associated with a media composition. Alternatively, an editor may circumvent the bin and cart entirely by selecting an item of secondary material directly from a list of search results for immediate preview at a selected location within a media composition. The selected item is added automatically to the cart in the background.

We now describe the reporting features enabled by the described system. As described above, during the secondary material research process, remote research stations (116, 118) and/or media composition system 102 receive metadata pertaining to the searched and selected secondary media. To obtain a current miming total of secondary material costs, the system sums the received pricing data, which is displayed to the user, in textual and/or graphical form, such as bar meter 412 (FIG. 4). Availability of usage rights for various territories may also be displayed, either textually or on a map. If secondary material of interest includes usage rights that cover only some of the required territories, the system may locate alternative choices, and attempt to minimize the cost by proposing different selections for different territories, with each of the selections satisfying the research criteria. The reports may be generated on remote research stations as well as within the media composition system.

Reporting formats may include an annotated bill of materials for secondary media required to complete a media composition. Another reporting technique involves annotating a timeline view of the media composition, in which each element of the timeline includes an annotation as to whether the material is primary or secondary, and optionally display the cost, the availability of the required usage licenses, quality, and other parameters of interest to the production team.

In order to make the report as accurate as possible, the reporting feature may exploit any available material information. For example, for cost reporting, cost totals reflect pricing based on factors that may include, but are not limited to the territory in which the media is to be delivered to a consumer, the nature of the venue or medium in which the composition is to be delivered to the consumer, the period of time over which the media is to be made available to consumers, and the media output platform. For reports generated within the media composition system, the system has access to additional details of the required usage that may affect pricing or usage rights, such as whether an entire clip or only a portion is required, or whether music is used while titles are shown in a video composition. In sum, when secondary material has been cut into a composition, i.e., when the precise secondary material usage requirements for a deliverable media composition are determined, real-time, accurate cost and license reporting becomes available.

The various components of the system described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, cathode ray tubes, video projection systems and other video output devices, printers, devices for communicating over a low or high bandwidth network, including network interface devices, cable modems, and storage devices such as disk or tape. One or more input devices may be connected to the computer system. Example input devices include, but are not limited to, a keyboard, keypad, track ball, mouse, pen and tablet, communication device, and data input devices. The invention is not limited to the particular input or output devices used in combination with the computer system or to those described herein.

The computer system may be a general purpose computer system which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic or optical discs, which may include an array of local or network attached discs.

A system such as described herein may be implemented in software or hardware or firmware, or a combination of the three. The various elements of the system, either individually or in combination may be implemented as one or more computer program products in which computer program instructions are stored on a computer readable medium for execution by a computer, or transferred to a computer system via a connected local area or wide are network. Various steps of a process may be performed by a computer executing such computer program instructions. The computer system may be a multiprocessor computer system or may include multiple computers connected over a computer network. The components described herein may be separate modules of a computer program, or may be separate computer programs, which may be operable on separate computers. The data produced by these components may be stored in a memory system or transmitted between computer systems.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of creating a time-based media composition, the method comprising:

using a computer-based media composition system connected to a wide-area network to search for secondary material available from secondary material providers connected to the wide-area network;

selecting an item of secondary material located during the searching step;

receiving over the wide area network descriptive metadata pertaining to the selected secondary material item;

inserting at a temporal location within the time-based media composition a representation of the selected secondary material item, wherein the time-based media composition includes primary media; and outputting a rendered portion of the time-based media composition spanning the temporal location, the portion including a portion of the primary media and a portion of the secondary material item, wherein outputting the secondary material portion involves outputting an evaluation version of the secondary material item that is streamed to the media composition system over the wide area network.

2. The method of claim 1, wherein the selected secondary material item is a video clip.

3. The method of claim 2, further comprising displaying the outputted rendered portion of the time-based media composition on a display device connected to the media composition system.

4. The method of claim 1, wherein the selected secondary material item is an audio clip.

5. The method of claim 1, wherein the selected secondary material item includes at least one of a digitally represented font, a sound effect, a graphical element, a video effect and an audio effect.

6. The method of claim 1, further comprising using the media composition system to purchase at least a portion of the selected secondary material item for inclusion within the time-based media composition.

7. The method of claim 6, wherein the received descriptive metadata includes a cost associated with usage of the purchased portion of the secondary material item within the time-based media composition, and wherein the media composition system displays an indication of the cost.

8. The method of claim 6 further comprising transferring to the media composition system over the wide-area network an original quality version of the purchased portion of the secondary material item.

9. The method of claim 8, further comprising dynamically re-linking the original quality version of the transferred portion of the selected secondary material item to the media composition.

10. The method of claim 1, wherein the received descriptive metadata includes information pertaining to usage rights available for the secondary material item.

11. The method of claim 1, wherein the inserted location is expressed as a time offset within the time-based media composition.

12. A system for editing a time-based media composition, the system comprising:

a memory for storing computer-readable instructions; and a processor connected to the memory, wherein the processor, when executing the computer-readable instructions, causes the media composition system to:

enable a user to search for secondary material over a wide-area network connected to the media composition system;

enable the user to select an item of secondary material identified by the searching;

receive over the wide area network descriptive metadata pertaining to the selected secondary material item;

enable the user to insert at a temporal location within the time-based media composition a representation of the selected secondary material item, wherein the media composition includes primary media; and output a rendered portion of the time-based media composition spanning the temporal location, the portion including a portion of the primary media and a portion of the secondary material item, wherein outputting the secondary material portion involves outputting an evaluation version of the secondary material item that is streamed to the media composition system over the wide area network.

13. A computer program product comprising:

a computer-readable memory; and computer-readable instructions stored in the computer-readable memory, wherein the instructions, when executed by a computer connected to a wide-area network, instruct the computer to perform a method of creating a time-based media composition, the method comprising:

enabling a user to search for secondary material over a wide-area network connected to the media composition system;

enabling the user to select an item of secondary material identified by the searching;

receiving over the wide area network descriptive metadata pertaining to the selected secondary material item;

enabling the user to insert at a temporal location within the time-based media composition a representation of the selected secondary material item, wherein the media composition includes primary media; and outputting a rendered portion of the time-based media composition spanning the temporal location, the portion including a portion of the primary media and a portion of the secondary material item, wherein outputting the secondary material portion involves outputting an evaluation version of the secondary material item that is streamed to the media composition system over the wide area network.

14. A method of creating a time-based media composition, the method comprising:

using a software application implemented on a client computer connected to a wide-area network to:

perform a search for secondary material available from secondary material providers connected to the wide-area network;

receive descriptive metadata pertaining to secondary material identified by the search;

select a secondary media item from the secondary material identified by the search;

transfer the received descriptive metadata pertaining to the selected secondary media item from the client computer to a media composition system over the wide-area network; and using the media composition system to:

insert at a temporal location within the time-based media composition a representation of the selected secondary media item, wherein the media composition includes primary media;

output a rendered portion of the time-based media composition spanning the temporal location, the portion including a portion of the primary media and a portion of the selected secondary media item, wherein outputting the selected secondary media portion involves outputting an evaluation version of the selected secondary media item that is streamed to the media composition system over the wide area network; and purchase at least a portion of the selected secondary item for inclusion within the media composition.

15. A method of creating a time-based media composition, the method comprising:

using a computer-based media composition system connected to a wide-area network to search for media available from secondary material providers connected to the wide-area network;

selecting an item of media located during the searching step;

receiving over the wide area network descriptive metadata pertaining to the selected media item;

inserting at a temporal location within the time-based media composition a representation of the selected media item;

outputting a rendered portion of the time-based media composition spanning the temporal location, the portion including a portion of the selected media item, wherein outputting the portion of the selected media item involves outputting an evaluation version of the selected media item that is streamed to the media composition system over the wide area network; and using the media composition system to purchase at least a portion of the selected media item for inclusion within the media composition.

16. The method of claim 15, wherein the selected media item is a video clip, and further comprising:

selecting an audio clip located during the searching step;

inserting at a second temporal location within the time-based media composition a representation of the selected audio clip, wherein a time span of the inserted representation of the selected audio clip overlaps with a time span of the inserted video clip; and wherein outputting the rendered portion of the time-based media includes playing an evaluation version of the selected audio clip that is streamed to the media composition system over the wide area network.

* * * * *